INVENTORS.
Leon T. Mart
Earl R. Allgeyer
BY
ATTORNEY.

INVENTORS.
Leon T. Mart
Earl R. Allgeyer
BY
ATTORNEY.

Aug. 13, 1957 L. T. MART ET AL 2,802,548
GEAR BOX LUBRICATING SYSTEM WITH OIL FILTER AND COOLER
Filed April 19, 1955 3 Sheets-Sheet 3

INVENTORS.
Leon T. Mart
Earl R. Allgeyer
BY
ATTORNEY.

United States Patent Office 2,802,548
Patented Aug. 13, 1957

2,802,548

GEAR BOX LUBRICATING SYSTEM WITH OIL FILTER AND COOLER

Leon T. Mart, Mission Township, Johnson County, Kans., and Earl R. Allgeyer, Kansas City, Mo., assignors to The Marley Company, Kansas City, Mo., a corporation of Delaware Application April 19, 1955, Serial No. 502,464

11 Claims. (Cl. 184—6)

This invention relates to a novel combination of parts for effecting circulation of a fluid through a filter and/or a cooler continuously during operation of a gear box without the necessity of a pump or other auxiliary means for producing such fluid movement.

It is the most important object of the present invention to provide a system for utilizing the gears themselves as a means for circulating the fluid by virtue of a meniscus in the gear box caused by the centrifugal action of one or more of the rotating gears on the fluid.

During the rotation of a horizontal ring gear within a gear box containing a fluid lubricant, there is produced, as a consequence of centrifugal action, a liquid meniscus having a relatively deep concavity. Consequently, there is a substantial difference in static head at the center of the liquid sump and at the outside of the sump. Furthermore, there is a circumferential velocity head incident to rotation of the gear which in turn causes the liquid to revolve about the vetrical axis of the said gear.

It is an important object of this invention to utilize the aforementioned pressure differentials as a means of causing the lubricant to be forced out of the gear box and into a filter to produce and maintain a head in the latter and thereupon, cause flow of the filtered liquid from the filter back to the gear box at a point where the head in the latter is below that of the filter whereby to produce a continued circulation while the gears being lubricated are in operation.

Figure 1:
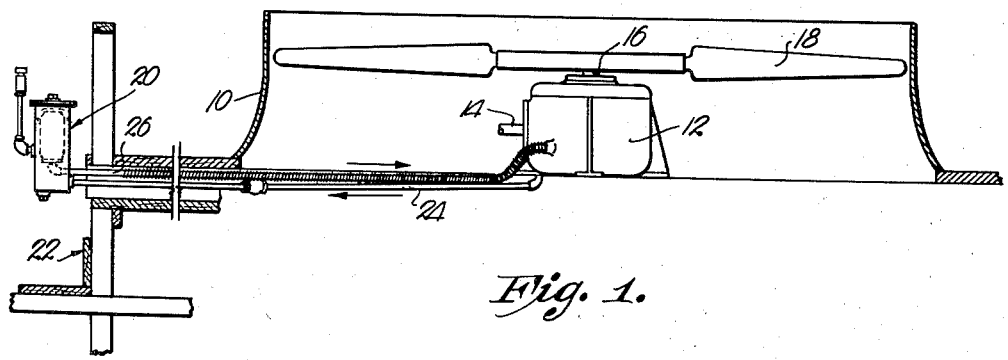
Figure 1 is a sectional view through a conventional water cooling tower illustrating in elevation one form of the gear box lubricating system with oil filter and cooler made pursuant to the present invention.

In Figure 1 of the drawings there is shown, for purposes of illustrating one manner using the instant invention, a conventional water cooling tower which may take the form of that shown in Patent No. 2,672,328, issued to Leon T. Mart, et al., on March 16, 1954. Such cooling tower has a fan ring 10 within which is supported in any suitable fashion, a hollow gear box 12 having a drive shaft 14 extending thereinto, together with a driven shaft 16 to which is attached a fan 18. Shaft 14 extends outwardly beyond the ring 10 and may be driven by an electric motor or other prime mover not shown.

In accordance with the present invention, a filter 20 preferably disposed exteriorly of the tower 22, is connected with the gear box 12 through a pickup pipe 24 and a return line 26. A pinion 41 within the box 12 and mounted on the drive shaft 14, meshes with a ring gear 28 within the box 12 and secured to the driven shaft 16. These gears rotate continuously within a sump of lubricating liquid 30 contained by gear box 12. It is manifest that, during rotation of the gear 28 in either direction, the fluid 30 will be revolved constantly within the box 12 about the vertical axis of the shaft 16 forming a concave meniscus 32 that is relatively shallow at the center of the sump 30 and having a head along the side wall 34 of the gear box 12 that may be substantially coincident with the height of box 12.

Consequently, there is a pressure differential resulting from the difference in static head at sump center 36 and sump outside 38 which results from the meniscus 32 caused by the centrifugal action of the rotating gear 28 on the lubricant 30, plus a velocity head along the inner face of side wall 34 that is greatest adjacent the gear 28 and caused by the rotational velocity of the lubricant 30.

Figure 2:
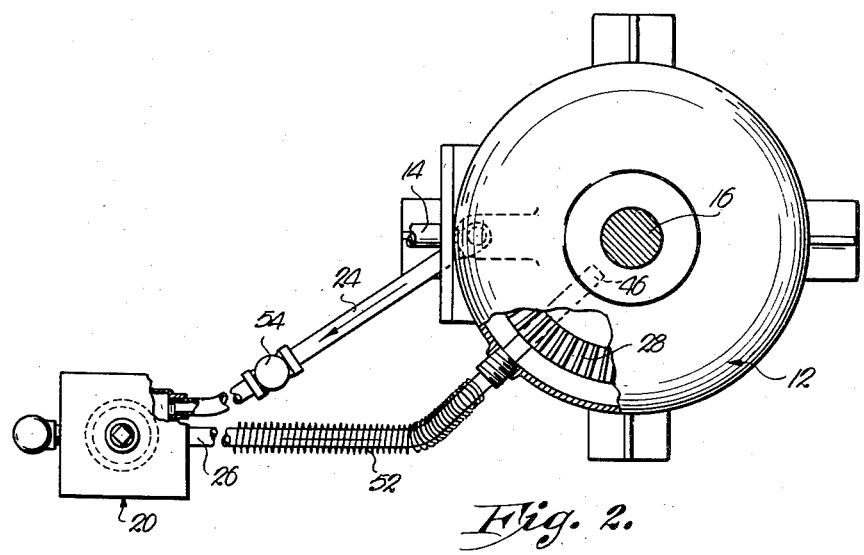
Fig. 2 is an enlarged, top plan view of the gear box, filter and associated parts, apart from the structure shown in Fig. 1.
Figure 3:
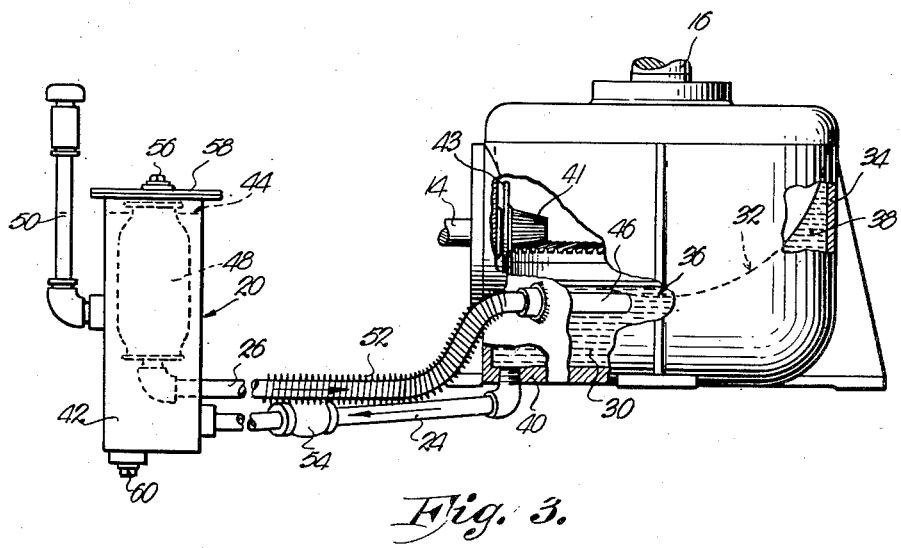
Fig. 3 is a side elevational view thereof, parts being broken away and in section for clearness.

The said difference in static heads is utilized in the form of the invention shown by Figs. 1 to 3 inclusive to cause continuous flow of the lubricant 30 from the gear box 12, through the pickup tube 24, the filter 20 and the return line 26 back to the box 12 while the gear 28 is rotating.

Accordingly, the inlet end of the pickup tube 24 is coupled with the box 12 at the bottom 40 thereof and adjacent the side wall 34 where it is accessible to the maximum head in gear box 12. This permits coupling the pickup tube 24 with the filter 20 adjacent the bottom of its case 42. The liquid in the case 42 will rise to a level 44 that is higher than the head 36 within box 12 and, therefore, the lubricant is drained from the case 42 and discharged into the box 12 at a point that is lower than the level 44. To this end the return line 26 has a radial discharge pipe 46 within the box 12 terminating adjacent the shaft 16 beneath the gear 28 and adjacent the sump center 36. As long as the mensicus 32 is produced by rotation of gear 28 with the lubricant relatively shallow at the sump center 36, the lubricant will flow from the casing 42 to the gear box 12 because of the maintained head 44 in the casing 42 which is caused by coupling the pickup tube 24 adjacent a point of maximum head in the gear box 12.

Filter 20 may be provided with a conventional filter medium 48, together with a sight tube 50 coupled with the case 42 to indicate the level of fluid 44 within the latter.

In order to cool the returning liquid, return line 26 is preferably provided with a heat dissipating fin 52 coiled thereabout. A check valve 54 is provided in the pickup tube 24 to prevent any return of unfiltered lubricant from the case 42 to the box 12 by way of pickup tube 24 when the gear 28 ceases to rotate. Gear box 12 may be filled with lubricant simply by removing a plug 56 on the casing 42 and the filter element 48 may be changed simply by removing a cap 58 within which the plug 56 is mounted. Moisture may be drained from the gear box 12 and the container 42, and similarly, the oil may be drained by removal of a plug 60.

The effectiveness of the system is enhanced by provision of an oil slinger plate 43 in box 12 mounted on shaft 14 for rotation therewith as shown in Fig. 3. Plate 43 tends to force the fluid downwardly into the pickup tube 24 and cooperates with the lowermost rotating face of the ring gear 28 in providing both a downward and a horizontal vector acting upon the oil and directing the same into tube 24. While pickup tube 24 is preferably located directly below the shaft 14 and, therefore, the pinion 41, as shown in Fig. 2, the precise location of the inlet end for pickup tube 24 will depend upon the direction of forces acting upon the oil through the slinger plate 43 and the ring gear 28.

Figure 4:
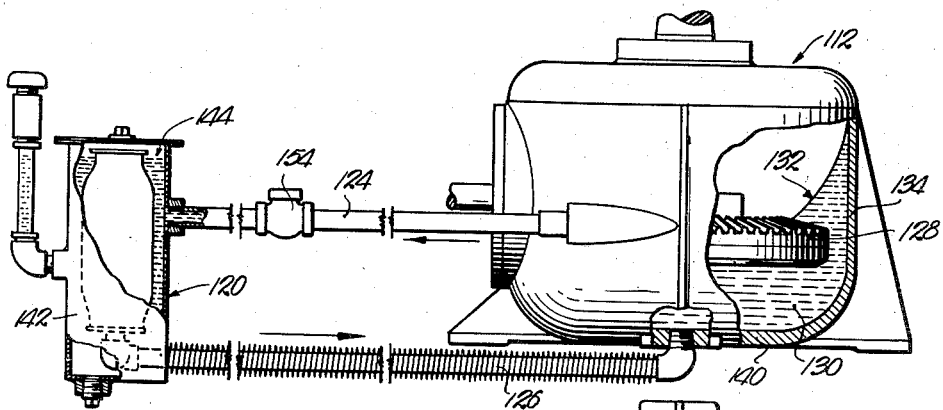
Fig. 4 is a view similar to Fig. 3 illustrating a modified form of the invention.
Figure 5:
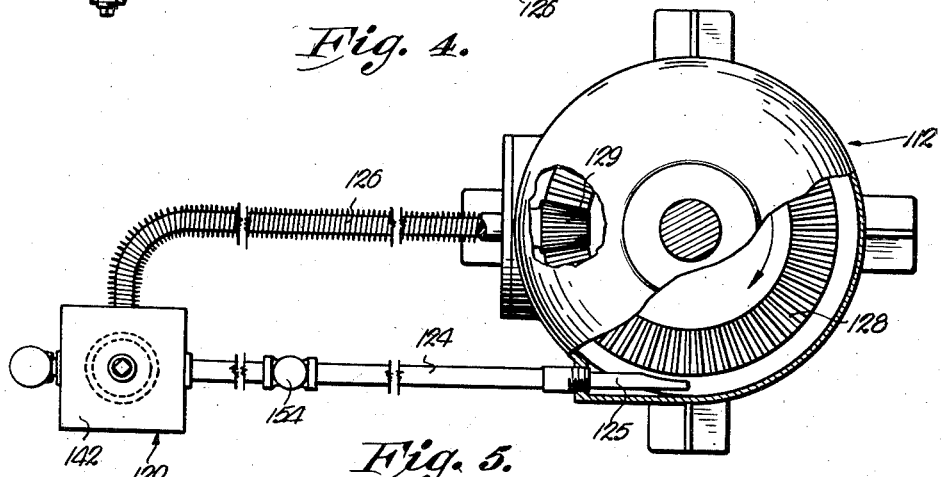
Fig. 5 is a view similar to Fig. 2 illustrating the form of the invention shown in Fig. 4.

In the form of the invention shown in Figs. 4 and 5 of the drawings, head 144 of lubricating oil 130 is maintained in casing 142 of filter 120 and continuous circulation of the oil 130 is produced by the pressure differential resulting from the velocity head as above described. Pickup tube 124 (provided with a check valve 154) is tangential to side wall 134 of gear box 112. As shown in Fig. 5, pickup tube 124 terminates within the box 112 in a pickup pipe 125 that is tangential to ring gear 128 which meshes with pinion 129. Since gear 128 rotates in the direction of the arrow shown in Fig. 5, a consequent revolving action is imparted to the oil 130 and the pipe 125 should, therefore, face oppositely to such oil movement. The pipe 125 is disposed adjacent the gear 128 and, therefore, adjacent the area of the greatest velocity, resulting in a flow of oil through the tube 124 to the casing 142 because of such velocity head.

A liquid meniscus 132 is produced in gear box 112 as a consequence of the rotation of gear 128, and, since the head 144 is above the center of such concave meniscus, the oil is drained by return line 126 from casing 142 to the center of the bottom wall 140 of gear box 112 where the liquid 130 is relatively shallow. If, on the other hand, it is desired in the form of the invention shown in Figs. 4 and 5, to make better use of the difference in static head at the sump center and at the outside of the sump, it is but necessary to raise the inlet pipe 125 which will diminish the effect of the velocity head, but take advantage of such velocity head as may exist nearer the top of box 112.

Figure 6:
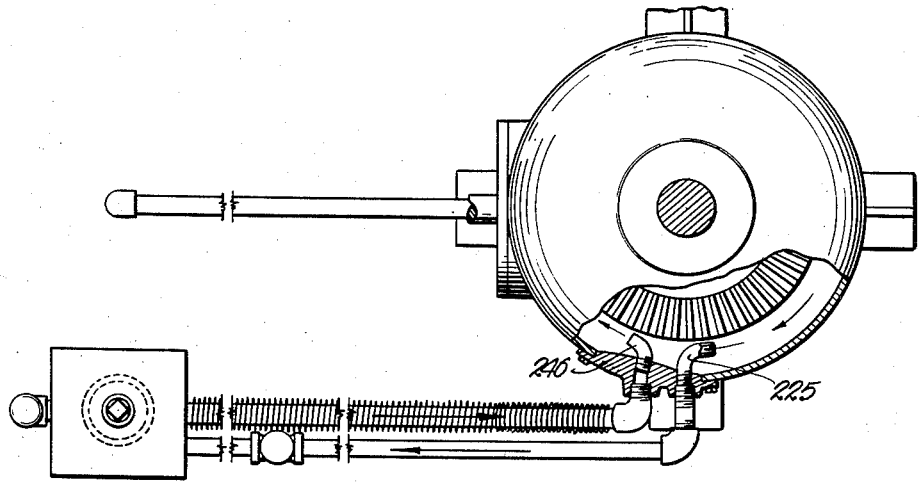
Fig. 6 is a view similar to Figs. 2 and 5, illustrating another form of the invention.
Figure 7:
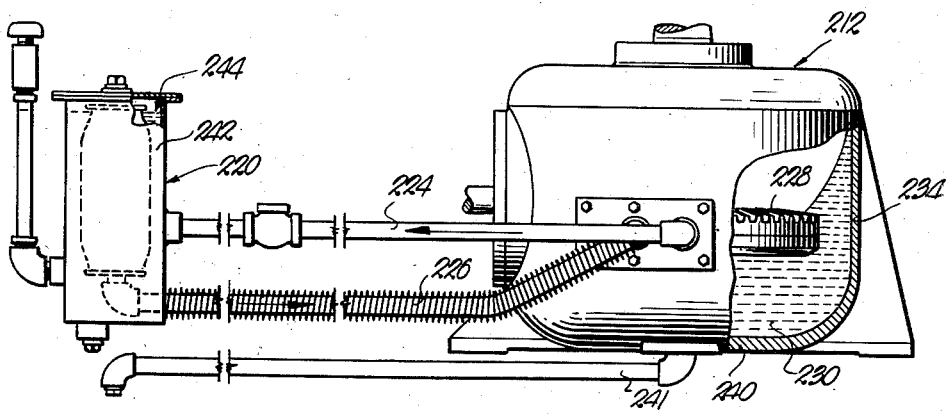
Fig. 7 is a view similar to Figs. 3 and 4 showing the embodiment of Fig. 6.
Figure 8:
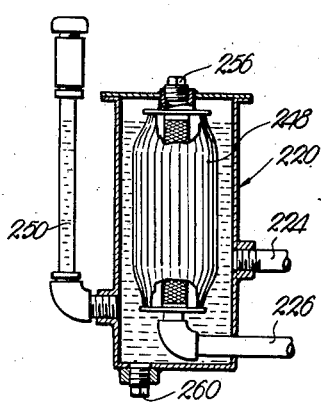
Fig. 8 is a vertical sectional view through the filter shown in Figs. 6 and 7.

In the system illustrated by Figs. 6 to 8 inclusive of the drawings, the velocity head resulting from centrifugal action upon lubricating oil 230 by rotating gear 228, is utilized to force the oil 230 through pickup tube 224 and into casing 242 of filter 220 and to establish oil head 244 in the casing 242 which is above the head at the sump center in gear box 212. To this end, the intake tube 224 is provided with an intake pipe 225 within the gear box 212 headed into the oil 230, revolving clockwise as indicated by the arrow in Fig. 6.

Here again, as in the case of the intake pipe 125 (Fig. 5) by locating the intake pipe 225 adjacent the gear 228, the greatest velocity head is utilized and, in order to cause return of the oil 230 to the box 212, outlet pipe 246 of return line 226, is disposed below the head 244 and is preferably turned inwardly at a tangent oppositely to the intake pipe 225.

The details of the filters hereinabove referred to are best seen in Fig. 8 of the drawings, showing filter element 248 within casing 242 to which the oil 230, emanating from tube 224, must pass before draining back to the box 212 by way of externally finned cooler line 226. Figure 8 illustrates in more detail the fill plug 256 and the drain plug 260 of the filter 220 as well as sight tube 250 thereof.

In summary, it is now seen that the various modifications of the lubricating oil system for gear boxes or other gear arrangements above described, effect circulation through a filter and a cooler without the necessity of a pump and that, in each case, a pressure differential is utilized to accomplish the continuous movement of the oil. In each case such pressure differential results from the action of the horizontal, rotating gear producing a meniscus by centrifugal action on the oil. Such oil movement within the gear box produces a rotational velocity which may be picked up to produce a head within the filter.

Similarly, by virtue of the meniscus, there is a relatively low static head at the sump center and an appreciably higher head adjacent the side wall of the gear box. This difference in static head may be utilized alone or in conjunction with the rotational velocity to maintain a head sufficiently high in the filter to assure flow of the filtered oil back to the gear box in the manners above described.

Having thus described the invention what is claimed as new and desired to be secured by Letters Patent is:

1. A system of the kind described comprising in combination, a gear box containing a fluid sump and having a top, a bottom and a side wall; a drive shaft and a driven shaft extending into the box; intermeshing gears in said box operably interconnecting said shafts, one of the gears being horizontally disposed to act upon said fluid centrifugally during rotation of the gears, thereby revolving the same to produce a concave meniscus with the depth of the fluid in the sump appreciably less at the center thereof than along said side wall; a filter for said fluid; a pickup tube coupled with the filter and having a connection with the box disposed to convey the fluid from the box, through said tube and into the filter in response to fluid pressure developed by said action of the one gear on the fluid; and a return line connected with the filter and discharging into the box, the fluid head in the filter at the return line being higher than the fluid head in the box at said return line whereby the fluid flows from the filter to the box and thereby circulates continuously through the filter while power is applied to the drive shaft to rotate the gears and the driven shaft.

2. A system as set forth in claim 1 wherein the fluid head in the box at the pickup tube is higher than said fluid head in the box at the return line, thereby producing a pressure differential for effecting said flow of fluid to the filter and establishing said fluid head therein.

3. A system as set forth in claim 1 wherein said pickup tube connects with the box adjacent the bottom and the side wall and the return line discharges into the box adjacent said center of the sump above said bottom whereby the pressure differential resulting from the difference in the static head in the sump at its center and at said side wall is utilized to effect said continuous circulation of the fluid.

4. A system as set forth in claim 1 wherein said return line is provided with external heat radiating fins for cooling the fluid prior to return to said gear box.

5. A system as set forth in claim 1 wherein said pickup tube extends into the side wall at a tangent to the revolving fluid in the box and is provided with an inlet end within the fluid in said box facing counter to the direction of movement of the fluid in the box whereby the velocity head at said inlet end is utilized to effect said flow of the fluid into the filter and establish said fluid head therein.

6. A system as set forth in claim 5 wherein said return line connects with the bottom at the center thereof whereby the pressure differential resulting from the difference in the static head in the sump at the center and at said side is utilized to further effect said continuous circulation of the fluid.

7. A system as set forth in claim 5 wherein said inlet end is disposed adjacent the one gear.

8. A system as set forth in claim 5 wherein the return line discharges into the side wall tangentially in said direction of movement of the fluid.

9. The invention as set forth in claim 3 wherein said gears consist of a horizontal ring gear on the driven shaft and a pinion on the drive shaft located above the pickup tube.

10. The invention as set forth in claim 3 wherein is provided a rotatable slinger within the box disposed to force fluid into the pickup tube.

11. The invention as set forth in claim 9 wherein is provided a slinger within the gear box and connected with said drive shaft for rotation therewith and disposed to force fluid into the pickup tube.

References Cited in the file of this patent

UNITED STATES PATENTS

| | | |
|---|---|---|
| 1,107,830 | Ogden | Aug. 18, 1914 |
| 1,339,769 | Leigh | May 11, 1920 |
| 1,393,875 | Woodworth | Oct. 18, 1921 |
| 1,483,830 | Moore | Feb. 12, 1924 |
| 1,508,914 | Belden | Sept. 16, 1924 |
| 1,971,412 | Howarth | Aug. 28, 1938 |
| 2,499,798 | Trail | Mar. 7, 1950 |